United States Patent
Zhao et al.

(10) Patent No.: US 11,113,886 B2
(45) Date of Patent: Sep. 7, 2021

(54) DUAL-SCREEN DISPLAY METHOD FOR ELIMINATING AR/VR PICTURE TEARING AND AR/VR DISPLAY DEVICE

(71) Applicants: Beijing BOE Optoelectronics Technology Co., Ltd., Beijing (CN); BOE Technology Group Co., Ltd., Beijing (CN)

(72) Inventors: Bin Zhao, Beijing (CN); Lixin Wang, Beijing (CN); Xi Li, Beijing (CN); Jianwen Suo, Beijing (CN); Qingwen Fan, Beijing (CN); Jinbao Peng, Beijing (CN); Ruifeng Qin, Beijing (CN); Yuanjie Lu, Beijing (CN); Jinghua Miao, Beijing (CN); Yukun Sun, Beijing (CN); Xuefeng Wang, Beijing (CN); Wenyu Li, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/384,119

(22) Filed: Apr. 15, 2019

(65) Prior Publication Data
US 2020/0098183 A1 Mar. 26, 2020

(30) Foreign Application Priority Data
Sep. 20, 2018 (CN) .......................... 201811106079.0

(51) Int. Cl.
*G06T 19/00* (2011.01)
*G06F 3/14* (2006.01)
(Continued)

(52) U.S. Cl.
CPC .......... *G06T 19/006* (2013.01); *G06F 3/1446* (2013.01); *G06K 9/00671* (2013.01); *G06T 15/005* (2013.01)

(58) Field of Classification Search
CPC ... G06T 19/006; G06T 15/005; G06F 3/1446; G06K 9/00671
See application file for complete search history.

(56) References Cited

U.S. PATENT DOCUMENTS

| 2010/0226628 A1* | 9/2010 | Yamaji ................. H04N 13/189 386/353 |
| 2014/0092150 A1* | 4/2014 | Slavenburg ............. G09G 5/12 345/698 |

OTHER PUBLICATIONS

Morrison ("Black frame insertion: Busting blur from Oculus to LCD TVs", 2014, https://www.cnet.com/news/black-frame-insertion-busting-blur-from-oculus-to-lcd-tvs/) (Year: 2014).*

* cited by examiner

*Primary Examiner* — Xin Sheng
(74) *Attorney, Agent, or Firm* — Westman, Champlin & Koehler, P.A.

(57) ABSTRACT

The present disclosure proposes a dual-screen display method for eliminating AR/VR picture tearing and an AR/VR display device, each single screen in a dual-screen for the dual-screen display method being divided into a first half-screen and a second half-screen respectively. The method includes: performing rendering and scanning in parallel for the first half-screen and the second half-screen in unit of half a frame. A start time of scanning the second half-screen is adjusted to eliminate a picture tearing phenomenon.

9 Claims, 4 Drawing Sheets

(51) Int. Cl.
*G06K 9/00* (2006.01)
*G06T 15/00* (2011.01)

Rendering and scanning are performed in parallel for the first screen and the second screen in unit of a frame — S50

Fig. 7

The first screen is scanned during a time period in which a second frame is rendered, wherein the second frame is displayed on the second screen — S51

The second screen is scanned during a time period in which a first frame is rendered, wherein the first frame is displayed on the first screen — S52

DUAL-SCREEN DISPLAY METHOD FOR ELIMINATING AR/VR PICTURE TEARING AND AR/VR DISPLAY DEVICE

CROSS-REFERENCE TO RELATED APPLICATION(S)

This application claims priority to the Chinese Patent Application No. 201811106079.0, filed on Sep. 20, 2018, which is incorporated herein by reference in its entirety.

TECHNICAL FIELD

The present disclosure generally relates to the field of display, and more particularly, to a dual-screen display method for eliminating Augmented Reality (AR)/Virtual Reality (VR) picture tearing and an AR/VR display device.

BACKGROUND

A VR system is generally applied in the field of games and video play etc., which requires frequent scene switching. In order to increase visual fluency for users, a display refresh rate is usually greater than 90 Hz. Since it takes several milliseconds for liquid crystal to make a response, a smear phenomenon caused by a liquid crystal response being not timely may occur during high-speed scene switching, which seriously affects the VR user experience. Currently, a method of turning off a backlight when the liquid crystal is used to make a response and turning on the backlight after the end of the response is relatively effective, and is called backlight black frame insertion.

When a dual-LCD display screen is used while using the black frame insertion technique, a scanning time of the screen is compressed, and conflicts with a rendering time in timing, which causes a boundary line phenomenon appearing on a picture, that is, picture tearing.

SUMMARY

According to an aspect of the present disclosure, there is provided a dual-screen display method for eliminating Augmented Reality (AR)/Virtual Reality (VR) picture tearing, each single screen in a dual-screen for the dual-screen display method being divided into a first half-screen and a second half-screen respectively, the method comprising:

performing rendering and scanning in parallel for the first half-screen and the second half-screen in unit of half a frame, wherein a rendering time of the frame is greater than a scanning time of the frame, and a start time of scanning the second half-screen is adjusted to eliminate a picture tearing phenomenon.

In an embodiment, performing rendering and scanning in parallel for the first half-screen and the second half-screen in unit of half a frame comprises:

scanning the first half-screen during a time period in which a second half-frame is rendered, wherein the second half-frame is displayed on the second half-screen; and scanning the second half-screen during a time period in which a first half-frame is rendered, wherein the first half-frame is displayed on the first half-screen.

In an embodiment, the scanning of the second half-screen starts at the end of the rendering of the second half-frame.

In an embodiment, the scanning of the first half-screen and the rendering of the second half-frame start at the same time.

In an embodiment, the rendering of the second half-frame and the scanning of the first half-screen end at the same time.

According to another aspect of the present disclosure, there is provided a dual-screen display method for eliminating Augmented Reality (AR)/Virtual Reality (VR) picture tearing, a dual-screen for the dual-screen display method being divided into a first screen and a second screen respectively, the method comprising:

performing rendering and scanning in parallel for the first screen and the second screen in unit of a frame, wherein a rendering time of the frame is greater than a scanning time of the frame, and a start time of scanning the second screen is adjusted to eliminate a picture tearing phenomenon.

In an embodiment, performing rendering and scanning in parallel for the first screen and the second screen in unit of a frame comprises:

scanning the first screen during a time period in which a second frame is rendered, wherein the second frame is displayed on the second screen; and scanning the second screen during a time period in which a first frame is rendered, wherein the first frame is displayed on the first screen.

In an embodiment, the scanning of the second screen starts at the end of the rendering of the second frame.

In an embodiment, the scanning of the first screen and the rendering of the second frame start at the same time.

In an embodiment, the scanning of the first screen and the rendering of the second frame end at the same time.

According to yet another aspect of the present disclosure, there is provided a Augmented Reality (AR)/Virtual Reality (VR) display device using the dual-screen display method for eliminating AR/VR picture tearing, comprising:

a buffer, comprising a first buffer region for storing rendering data of a first half-frame and a second buffer region for storing rendering data of a second half-frame, or a first buffer region for storing rendering data of a first frame and a second buffer region for storing rendering data of a second frame;

a rendering circuit;

a scanning circuit; and a control circuit configured to control the rendering circuit to write data into the buffer and control the scanning circuit to read data from the buffer, wherein the control circuit is configured to adjust a start time of reading data from the second buffer region by the scanning circuit to eliminate a picture tearing phenomenon.

In an embodiment, the control circuit is configured to:

control the scanning circuit to read data from the first buffer region during a time period in which the rendering circuit writes data into the second buffer region; and control the scanning circuit to read data from the second buffer region during a time period in which the rendering circuit writes data into the first buffer region.

In an embodiment, the control circuit is configured to:

control the scanning circuit to start reading data from the second buffer region when the rendering circuit completes writing data into the second buffer region.

In an embodiment, the control circuit is configured to:

control the scanning circuit to start reading data from the first buffer region when the rendering circuit starts writing data into the second buffer region.

In an embodiment, the control circuit is configured to:

control the scanning circuit to complete reading data from the first buffer region when the rendering circuit completes writing data into the second buffer region.

BRIEF DESCRIPTION OF THE ACCOMPANYING DRAWINGS

Other features, purposes, and advantages of the present disclosure will become more apparent from the following detailed description of non-restrictive embodiments with reference to the accompanying drawings.

DETAILED DESCRIPTION

The present disclosure will be further described in detail below in conjunction with the accompanying drawings and embodiments. It can be understood that the specific embodiments described here are merely used to explain the present disclosure, instead of limiting the present disclosure. It should also be illustrated that, for the convenience of description, only parts related to the present disclosure are shown in the accompanying drawings.

It should be illustrated that the embodiments in the present disclosure and the features in the embodiments may be combined with each other without conflict. The present disclosure will be described in detail below with reference to the accompanying drawings and in combination with the embodiments.

In the field of AR/VR wearable display, after a hardware sensor (for example, a gyroscope) collects posture data of a corresponding part of a body, coordinate conversion and angle of view conversion are performed on the posture data, and an image is output by combining the converted data with information such as texture, illumination etc. The image processing procedure described above is called rendering. After the rendering, the image is usually output frame by frame by a Graphic Processing Unit (GPU) according to a graphics rendering pipeline, and the rendered image is stored in a buffer for a display screen to extract image frames and scan the image frames thereon. A process of progressively traversing grayscale values of the image to respective pixel circuits according to a timing is called scanning. Gate lines are usually scanned by a driving circuit of an array substrate and grayscale values are written into the gate lines.

In addition, in the field of AR/VR display, in order to meet the requirements for low afterglow of display, the backlight black frame insertion technique is usually used to reserve sufficient response time and black frame insertion time. This causes the screen scanning time to be greatly compressed to be less than rendering time. At this time, when the same buffer is used for scanning and rendering, a boundary line is prone to appearing on a picture, that is, a picture tearing phenomenon is prone to occur.

Figure 1:
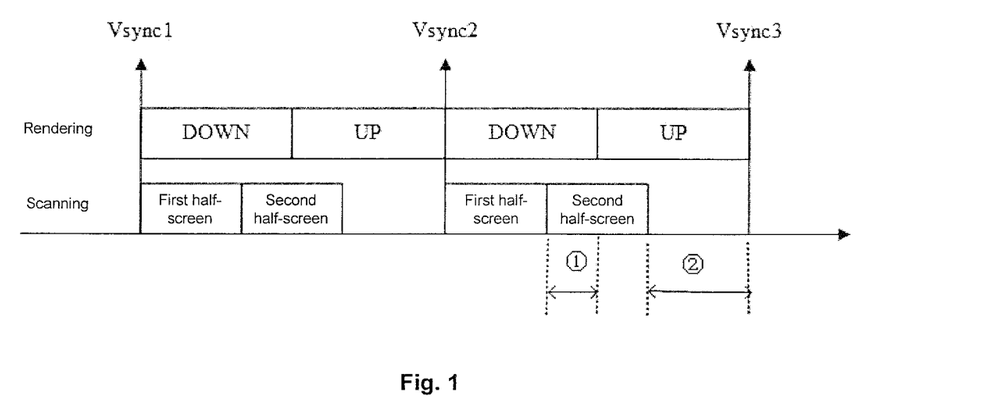
FIG. 1 illustrates an exemplary schematic diagram of a tearing generating timing.
Figure 2:
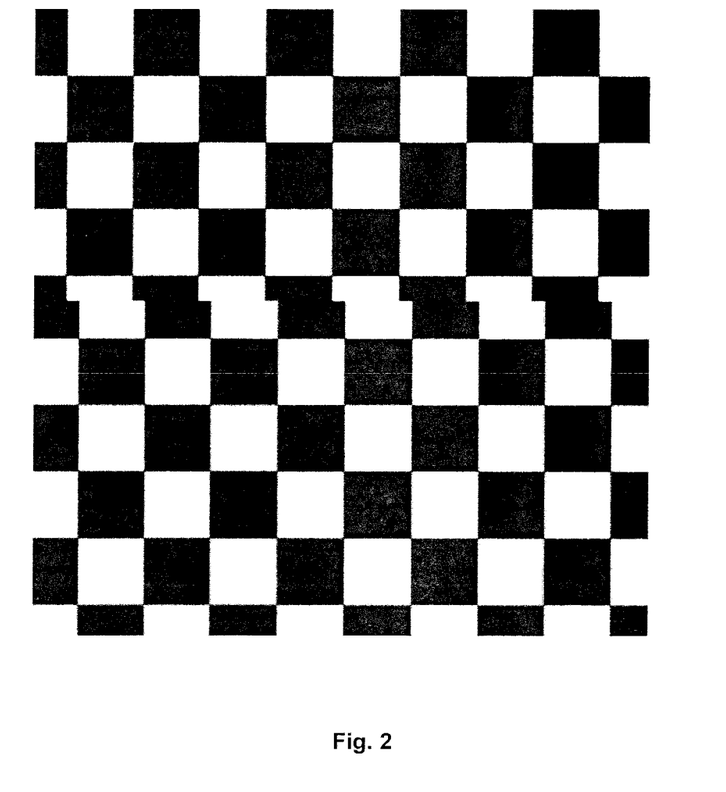
FIG. 2 illustrates an exemplary schematic diagram of a torn picture.

As shown in FIG. 1, illustrated is an exemplary schematic diagram of a tearing generating timing. As shown, as in VR display, when one screen is divided into upper and lower half-screens for display, scanning and rendering are alternately performed in unit of half a frame. During a time period in which a second half-frame DOWN displayed on a second half-screen is rendered, a first half-screen is scanned; and during a time period in which a first half-frame UP displayed on the first half-screen is rendered, the second half-screen is scanned. Since the scanning time is compressed, the time to scan the full screen is less than the time to render the entire frame. At this time, during a time period in which a lower half-frame DOWN is rendered, a lower half-screen may be scanned in advance. That is, the same buffer region is read and written at the same time. As a result, a problem interval ① appears for the lower half-screen, and a tearing phenomenon occurs accordingly. An interval ② is a response time of liquid crystal after scanning. FIG. 2 illustrates an exemplary diagram of a torn picture. Similarly, in a case of scanning left and right screens, when frame data is read and written at the same time, tearing of a display picture is prone to occur.

In view of the above cases, a technical solution for solving the picture tearing phenomenon during half-screen display and a technical solution for solving the picture tearing phenomenon during left and right screen display are provided respectively.

The present disclosure discloses a dual-screen display method for eliminating AR/VR picture tearing, which is suitable for the case of half-screen display.

Figure 3:
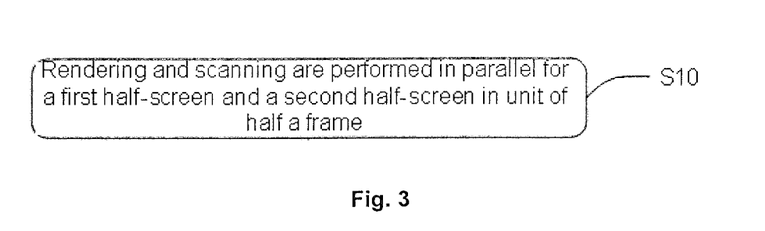
FIG. 3 illustrates an exemplary flowchart of a dual-screen display method for eliminating AR/VR picture tearing according to an embodiment of the present disclosure.

As shown in FIG. 3, illustrated is an exemplary flowchart of a dual-screen display method for eliminating AR/VR picture tearing according to an embodiment of the present disclosure. Each single screen in a dual-screen for the dual-screen display method is divided into a first half-screen and a second half-screen respectively. As shown in FIG. 3, the method comprises the following steps.

In step S10, rendering and scanning are performed in parallel for a first half-screen and a second half-screen in unit of half a frame.

In the present embodiment, a start time of scanning the second half-screen is adjusted to eliminate a picture tearing phenomenon.

In the VR display, each original frame is firstly rendered and then scanned, wherein a single screen is scanned using a solution of dividing the screen into an upper half-screen and a lower half-screen, and scanning the upper half-screen and the lower half-screen in a time-division manner by, for example, firstly scanning the lower half-screen and then scanning the upper half-screen, or firstly scanning the upper half-screen and then scanning the lower half-screen, so as to achieve full-screen display. At this time, rendering is performed in unit of half a frame. In order to improve display efficiency, scanning and rendering are performed in parallel. It should be illustrated that, according to practical conditions, the first half-screen may be one of the upper half-screen and the lower half-screen, the second half-screen may be the other of the upper half-screen and the lower half-screen, and the first half-screen and the second half-screen constitute a full screen. In the dual-screen display, the first half-screen comprises two half-screens, that is, a first half-screen for a left eye and a first half-screen for a right eye.

Figure 4:
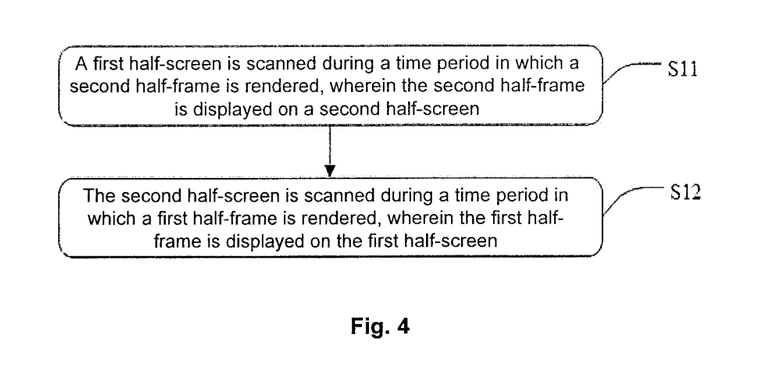
FIG. 4 illustrates an exemplary flowchart of step S10 according to an embodiment of the present disclosure.

As shown in FIG. 4, illustrated is an exemplary flowchart of step S10 according to an embodiment of the present disclosure. Step S10 comprises the following steps.

In step S11, a first half-screen is scanned during a time period in which a second half-frame is rendered, wherein the second half-frame is displayed on a second half-screen.

In step S12, the second half-screen is scanned during a time period in which a first half-frame is rendered, wherein the first half-frame is displayed on the first half-screen.

One frame is divided into a first half-frame and a second half-frame, and one of the half-frames is rendered while scanning the other half-frame which has been rendered, that is, achieving parallel rendering and scanning of one frame, which reduces display delay and improves the VR experience. It should be illustrated that the first half-frame comprises two half-frames, that is, half-frames for left and right eyes, and similarly, during scanning, half-screens of left and right screens are scanned at the same time. Specific implementations may be known with reference to the description parts of FIGS. 5 and 6.

Figure 5:
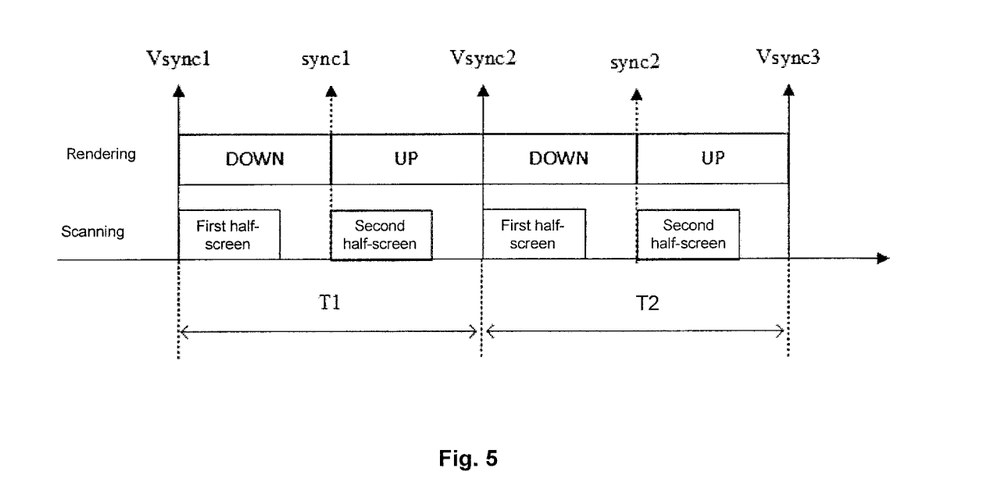
FIG. 5 illustrates an exemplary schematic diagram of a first rendering and scanning timing according to an embodiment of the present disclosure.
Figure 6:
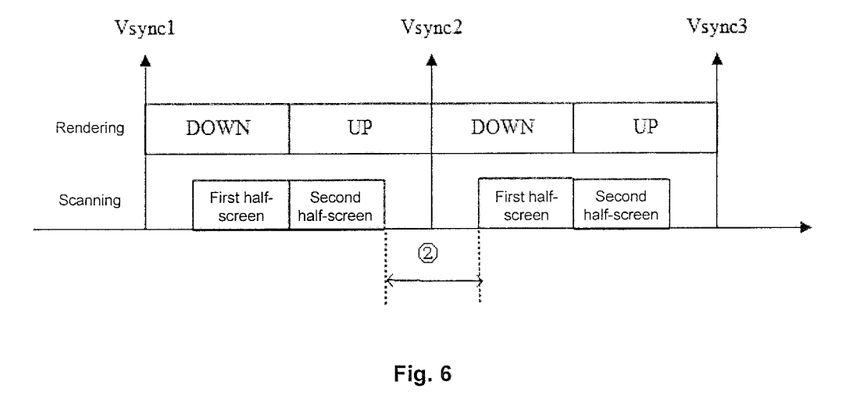
FIG. 6 illustrates an exemplary schematic diagram of a second rendering and scanning timing according to an embodiment of the present disclosure.

Next, as shown in FIGS. 5 and 6, FIG. 5 illustrate an exemplary schematic diagram of a first rendering and scanning timing according to an embodiment of the present disclosure, and FIG. 6 illustrates an exemplary schematic diagram of a second rendering and scanning timing according to an embodiment of the present disclosure.

It can be seen according to analysis of FIG. 1 that picture tearing is prone to occur when data is read and written at the same time, that is, the picture tearing is prone to occur when frame data is scanned while the frame data is being rendered. If the problem interval ① is eliminated, the picture tearing may be eliminated. Therefore, in the present disclosure, the problem interval ① is eliminated by starting the scanning of the second half-screen after the end of the rendering of the second half-frame DWON.

The following rendering/scanning timings may occur depending on the scanning time of the first half-screen.

As shown in FIG. 5, illustrated is a rendering/scanning timing of two pictures, comprising a first interval T1 for rendering a first picture between synchronization signals Vsync1 and Vsync2 and a second interval T2 for rendering a second picture between synchronization signals Vsync2 and Vsync3. In the first interval T1, an entire frame comprises a first half-frame UP and a second half-frame DOWN, a first half-screen is used to display the first half-frame UP, and a second half-screen is used to display the second half-frame DOWN. Scanning of the first half-screen starts at the time when rendering of the second half-frame DOWN starts, that is, the rendering of the second half-frame DOWN and the scanning of the first half-screen start at the same time. Scanning of the second half-screen starts at the end of the rendering of the second half-frame. In practical applications, this may be realized by performing synchronization once when rendering of each half-frame starts, and the synchronization signals further comprise sync1, sync2, etc. At this time, the case that data is read and written at the same time does not occur in any half-frame, which effectively eliminates the picture tearing.

As shown in FIG. 6, in another case, the rendering of the second half-frame DOWN ends at the end of the scanning of the first half-screen, that is, the rendering of the second half-frame DOWN and the scanning of the first half-screen end at the same time. At this time, the case that data is read and written at the same time does not occur in any frame, which effectively eliminates the picture tearing, and the liquid crystal has a long response interval ②, which is beneficial for reducing the afterglow.

The present disclosure further provides a method for eliminating AR/VR picture tearing, which is suitable for dual-screen display using left and right screens.

Figure 7:
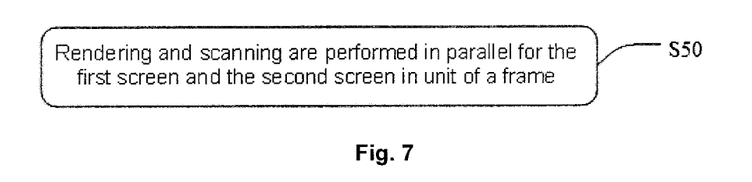
FIG. 7 illustrates an exemplary flowchart of another dual-screen display method for eliminating AR/VR picture tearing according to an embodiment of the present disclosure.

As shown in FIG. 7, illustrated is an exemplary flowchart of another dual-screen display method for eliminating AR/VR picture tearing according to an embodiment of the present disclosure. A dual-screen for the dual-screen display method is divided into a first screen and a second screen. As shown in FIG. 7, the method comprises the following steps.

In step S50, rendering and scanning are performed in parallel for the first screen and the second screen in unit of a frame.

In an embodiment, a start time of scanning the second screen is adjusted to eliminate a picture tearing phenomenon.

In the VR display, a pixel circuit is scanned using a solution of dividing a screen into a left screen and a right screen, and scanning the left screen and the right screen in a time-division manner by, for example, firstly scanning the left screen and then scanning the right screen, or firstly scanning the right screen and then scanning the left screen, so as to achieve full screen display. At this time, rendering is performed in units of frames. In order to improve display efficiency, scanning and rendering are performed in parallel. It should be illustrated that, according to practical conditions, the first screen may be one of the left screen and the right screen, the second screen may be the other of the left screen and the right screen, and the first screen and the second screen constitute a dual-screen for the VR display.

Figure 8:
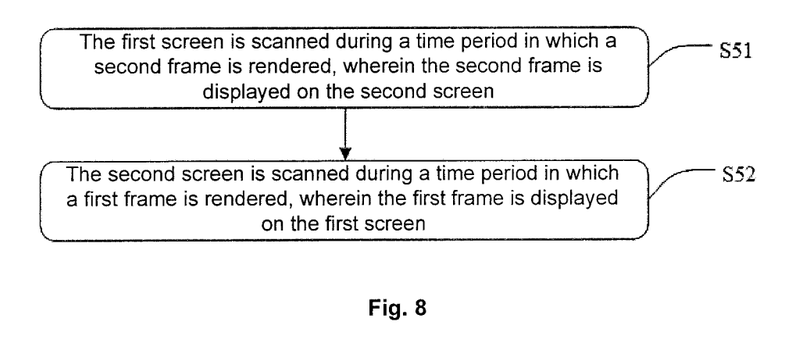
FIG. 8 illustrates an exemplary flowchart of step S50 according to an embodiment of the present disclosure.

FIG. 8 illustrates an exemplary flowchart of step S50 according to an embodiment of the present disclosure. Step S50 comprises the following steps.

In step S51, the first screen is scanned during a time period in which a second frame is rendered, wherein the second frame is displayed on the second screen.

In step S52, the second screen is scanned during a time period in which a first frame is rendered, wherein the first frame is displayed on the first screen.

Left and right eye frames are divided into a first frame and a second frame. When one of the frames is rendered, the other is scanned, so as to realize parallel rendering and scanning of the left and right eye frames, which reduces the display delay and improves the VR experience. It should be illustrated that the first frame may be one of the left and right eye frames, and the second frame may be the other of the left and right eye frames. Similarly, the first screen may be one of a left eye screen and a right eye screen, and the second screen may be the other of the left eye screen and the right eye screen.

Figure 9:
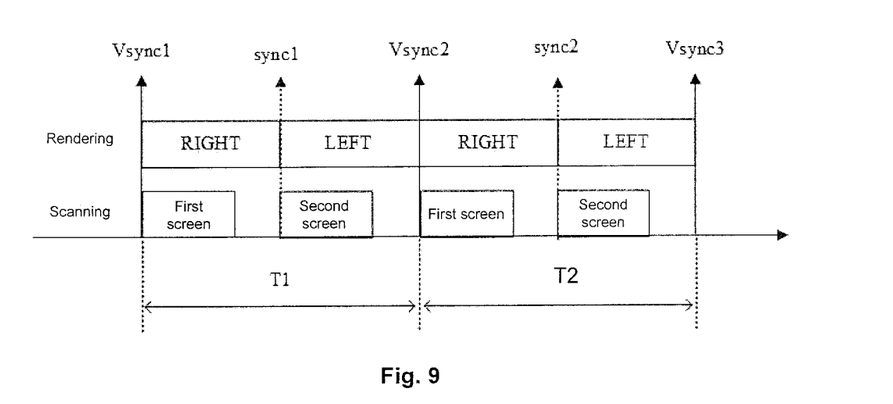
FIG. 9 illustrates an exemplary schematic diagram of a third rendering and scanning timing according to an embodiment of the present disclosure.
Figure 10:
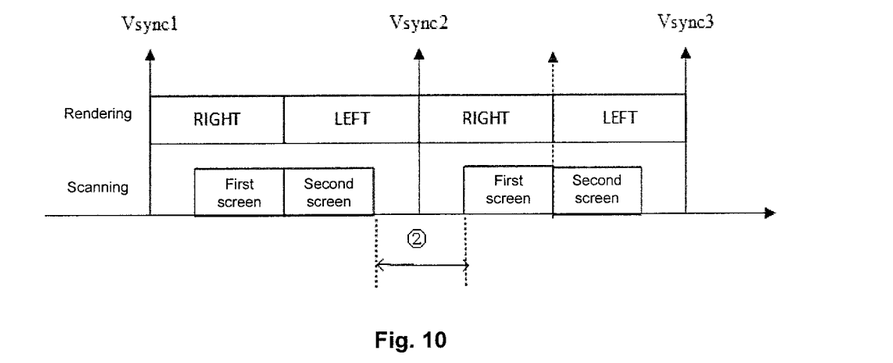
FIG. 10 illustrates an exemplary schematic diagram of a fourth rendering and scanning timing according to an embodiment of the present disclosure.

Next, as shown in FIGS. 9 and 10, FIG. 9 illustrates an exemplary schematic diagram of a third rendering and scanning timing according to an embodiment of the present disclosure, and FIG. 10 illustrates an exemplary schematic diagram of a fourth rendering and scanning timing according to an embodiment of the present disclosure.

It can be seen according to the analysis described above that the picture tearing is prone to occur when the data is read and written at the same time, that is, the picture tearing is prone to occur when the frame data is scanned while the frame data is being rendered. If the problem interval ① is eliminated, the picture tearing may be eliminated. Therefore, the problem interval ① is eliminated by starting the scanning of the second screen after the end of the rendering of the second frame RIGHT.

The following rendering/scanning timings may occur depending on the scanning time of the first screen.

As shown in FIG. 9, illustrated is a rendering/scanning timing of two pictures, comprising a first interval T1 for rendering a first picture between synchronization signals Vsync1 and Vsync2 and a second interval T2 for rendering a second picture between synchronization signals Vsync2 and Vsync3. In the first interval T1, one picture comprises a first frame LEFT and a second frame RIGHT, a first screen is used to display the first frame LEFT, and a second screen is used to display the second frame RIGHT. Scanning of the first screen starts at the time when rendering of the second frame RIGHT starts, that is, the rendering of the second frame RIGHT and the scanning of the first screen start at the same time. The scanning of the second screen starts at the end of the rendering of the second frame. Synchronization is performed once at the beginning of rendering of each frame. The synchronization signals further comprise sync1, sync2, etc. At this time, the case that data is read and written at the same time does not occur in any frame, which thereby effectively eliminates the picture tearing.

As shown in FIG. 10, in another case, the scanning of the first screen ends at the end of the rendering of the second frame RIGHT, that is, the rendering of the second frame RIGHT and the scanning of the first screen end at the same time. At this time, the case that data is read and written at the same time does not occur in any frame, which effectively eliminates the picture tearing, and the liquid crystal has a long response interval ②, which is beneficial for reducing the afterglow.

The present disclosure further provides an AR/VR display device. In practical applications, rendering and screen scanning may be performed using the same buffer and the buffer is divided into regions required. Rendered Data is written into a corresponding buffer region during rendering, and data is read from the corresponding buffer region during scanning. The picture tearing is caused by the same buffer region being read and written at the same time, and therefore the problem of picture tearing is eliminated by performing writing and reading in a time-division manner. A specific description is as follows.

Figure 11:
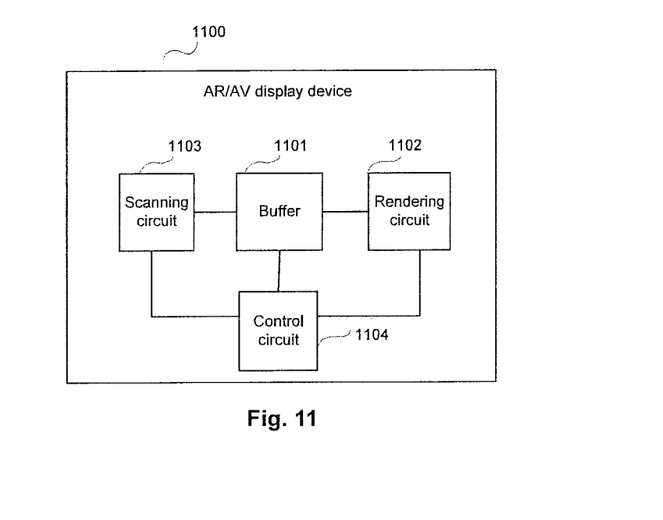
FIG. 11 illustrates a block diagram of an AR/VR display device according to an embodiment of the present disclosure.

As shown in FIG. 11, illustrated is a block diagram of an AR/VR display device 1100 according to an embodiment of the present disclosure. The AR/VR display device 1100 comprises a buffer 1101 for storing rendered data, a rendering circuit 1102, a scanning circuit 1103, and a control circuit 1104.

The buffer 1101 comprises a first buffer region for storing rendering data of a first half-frame and a second buffer region for storing rendering data of a second half-frame, or the buffer 1101 comprises a first buffer region for storing rendering data of a first eye frame and a second buffer region for storing rendering data of a second eye frame.

The control circuit 1104 is configured to control the rendering circuit 1102 to write data into the buffer 1101, and control the scanning circuit 1103 to read data from the buffer 1101. The control circuit 1104 adjusts a start time of reading data from the second buffer region by the scanning circuit 1103, so as to eliminate the picture tearing phenomenon.

The principles of this part may be known with reference to the description of FIGS. 3 and 7.

In some embodiments, the control circuit 1104 is configured to control the scanning circuit 1103 to read data from the first buffer region during a time period in which the rendering circuit 1102 writes data into the second buffer region.

The control circuit 1104 is configured to control the scanning circuit 1103 to read data from the second buffer region during a time period in which the rendering circuit 1102 writes data into the first buffer region.

In some embodiments, the control circuit 1104 is configured to control the scanning circuit to start reading data from the second buffer region when the rendering circuit 1102 completes writing data into the second buffer region.

In some embodiments, the control circuit 1104 is configured to control the scanning circuit 1103 to start reading data from the first buffer region when the rendering circuit 1102 starts writing data into the second buffer region.

In some embodiments, the control circuit 1104 is configured to control the scanning circuit 1103 to complete reading data from the first buffer region when the rendering circuit 1102 completes writing data into the second buffer region.

The flowcharts and block diagrams in the accompanying drawings illustrate architecture, functions, and operations of possible implementations of systems, methods, and computer program products according to various embodiments of the present disclosure. In this regard, each block of the flowcharts or block diagrams can represent a module, a program segment, or a portion of codes, which comprises one or more executable instructions for implementing specified logical functions. It should also be illustrated that in some alternative implementations, the functions noted in the block may also occur in a different order than that illustrated in the accompanying drawings. For example, two successively represented blocks may in fact be executed substantially in parallel, and they may sometimes be executed in a reverse order, depending upon the functionality involved. It should also be illustrated that each block of the block diagrams and/or flowcharts, and combinations of blocks in the block diagrams and/or flowcharts, can be implemented in a dedicated hardware-based system which performs the specified functions or operations, or can be implemented by a combination of dedicated hardware and computer instructions.

The above description is only preferable embodiments of the present disclosure and a description of the principles of the applied technology. It should be understood by those skilled in the art that the scope of the present disclosure is not limited to the technical solutions formed by a specific combination of the above technical features, and should also encompass other technical solutions formed by any combination of the above technical features or equivalent features, for example, technical solutions formed by replacements of the above features by, but not limited to, technical features having similar functions to those disclosed by the present disclosure.

We claim:
1. A dual-screen display method for eliminating Augmented Reality (AR)/Virtual Reality (VR) picture tearing, each single screen in a dual-screen for the dual-screen display method being divided into a first half-screen and a second half-screen respectively the picture tearing is caused by a backlight black frame insertion for turning off a backlight upon a response of liquid crystal and turning on the backlight after the end of the response, and, the method comprising:
performing rendering and scanning in parallel for the first half-screen and the second half-screen in unit of half a frame, wherein a rendering time of the frame is greater than a scanning time of the frame, and a start time of scanning the second half-screen is adjusted to eliminate a picture tearing phenomenon, wherein performing rendering and scanning in parallel for the first half-screen and the second half-screen in unit of half a frame comprises:

scanning the first half-screen during a first time period in which a second half-frame is rendered, wherein the second half-frame is displayed on the second half-screen, wherein the first time period is between a first vertical sync signal Vsync1 and a first a1 sync signal sync1; and scanning the second half-screen during a second time period in which a first half-frame is rendered, wherein the first half-frame is displayed on the first half-screen, wherein the second time period is between the first sync signal sync1 and a second vertical sync signal Vsync2; and wherein the rendering of the second half-frame and the scanning of the first half-screen start at the same time and a duration for the rendering of the second half-frame is greater than that for the scanning of the first half-screen;

wherein the rendering of the first half-frame and the scanning of the second half-screen start at the same time and a duration for the rendering of the first half-frame is greater than that for the scanning of the second half-screen.

2. The dual-screen display method for eliminating AR/VR picture tearing according to claim 1, wherein the scanning of the second half-screen starts at the end of the rendering of the second half-frame.

3. An Augmented Reality (AR)/Virtual Reality (VR) display device using the dual-screen display method for eliminating AR/VR picture tearing according to claim 1, comprising:

a buffer, comprising a first buffer region for storing rendering data of a first half-frame and a second buffer region for storing rendering data of a second half-frame, or a first buffer region for storing rendering data of a first frame and a second buffer region for storing rendering data of a second frame;

a rendering circuit;

a scanning circuit; and a control circuit configured to control the rendering circuit to write data into the buffer and control the scanning circuit to read data from the buffer, wherein the control circuit is configured to adjust a start time of reading data from the second buffer region by the scanning circuit to eliminate a picture tearing phenomenon.

4. The AR/VR display device according to claim 3, wherein the control circuit is configured to:

control the scanning circuit to read data from the first buffer region during a time period in which the rendering circuit writes data into the second buffer region; and control the scanning circuit to read data from the second buffer region during a time period in which the rendering circuit writes data into the first buffer region.

5. The AR/VR display device according to claim 3, wherein the control circuit is configured to:

control the scanning circuit to start reading data from the second buffer region when the rendering circuit completes writing data into the second buffer region.

6. The AR/VR display device according to claim 5, wherein the control circuit is configured to:

control the scanning circuit to start reading data from the first buffer region when the rendering circuit starts writing data into the second buffer region.

7. The AR/VR display device according to claim 5, wherein the control circuit is configured to:

control the scanning circuit to complete reading data from the first buffer region when the rendering circuit completes writing data into the second buffer region.

8. A dual-screen display method for eliminating Augmented Reality (AR)/Virtual Reality (VR) picture tearing, a dual-screen for the dual-screen display method being divided into a first screen and a second screen respectively, the picture tearing is caused by a backlight black frame insertion for turning off a backlight upon a response of liquid crystal and turning on the backlight after the end of the response, and the method comprising:

performing rendering and scanning in parallel for the first screen and the second screen in unit of a frame, wherein a rendering time of the frame is greater than a scanning time of the frame, and a start time of scanning the second screen is adjusted to eliminate a picture tearing phenomenon, wherein performing rendering and scanning in parallel for the first screen and the second screen in unit of a frame comprises:

scanning the first screen during a first time period in which a second frame is rendered, wherein the second frame is displayed on the second screen, wherein the first time period is between a first vertical sync signal Vsync1 and a first a1 sync signal sync1; and scanning the second screen during a second time period in which a first frame is rendered, wherein the first frame is displayed on the first screen, wherein the second time period is between the first sync signal sync1 and a second vertical sync signal Vsync2, wherein the scanning of the first screen and the rendering of the second frame start at the same time and a duration for the rendering of the second frame is greater than that for the scanning of the first screen;

wherein the rendering of the first frame and the scanning of the second screen start at the same time and a duration for the rendering of the first frame is greater than that for the scanning of the second screen.

9. The dual-screen display method for eliminating AR/VR picture tearing according to claim 8, wherein the scanning of the second screen starts at the end of the rendering of the second frame.

* * * * *